(12) United States Patent
Yamasaki et al.

(10) Patent No.: US 9,487,630 B2
(45) Date of Patent: Nov. 8, 2016

(54) METHOD FOR MANUFACTURING POLYROTAXANE

(71) Applicants: SUMITOMO SEIKA CHEMICALS CO., LTD., Hyogo (JP); ADVANCED SOFTMATERIALS INC., Kashiwa-shi, Chiba (JP)

(72) Inventors: Tomoaki Yamasaki, Hyogo (JP); Akira Kimura, Hyogo (JP); Hiroki Okazaki, Hyogo (JP); Changming Zhao, Chiba (JP)

(73) Assignees: Sumitomo Seika Chemicals Co., Ltd., Hyogo (JP); Advanced Softmaterials Inc., Chiba (JP)

( * ) Notice: Subject to any disclaimer, the term of this patent is extended or adjusted under 35 U.S.C. 154(b) by 56 days.

(21) Appl. No.: 14/428,917

(22) PCT Filed: Sep. 9, 2013

(86) PCT No.: PCT/JP2013/074247
§ 371 (c)(1),
(2) Date: Mar. 17, 2015

(87) PCT Pub. No.: WO2014/045921
PCT Pub. Date: Mar. 27, 2014

(65) Prior Publication Data
US 2015/0240036 A1 Aug. 27, 2015

(30) Foreign Application Priority Data
Sep. 19, 2012 (JP) .................................. 2012-205834

(51) Int. Cl.
| | |
|---|---|
| C08G 81/00 | (2006.01) |
| C08G 83/00 | (2006.01) |
| C08B 37/16 | (2006.01) |
| C08L 5/16 | (2006.01) |
| C08G 65/332 | (2006.01) |
| C08G 65/333 | (2006.01) |

(52) U.S. Cl.
CPC ............ *C08G 81/00* (2013.01); *C08B 37/0015* (2013.01); *C08G 65/332* (2013.01); *C08G 65/33306* (2013.01); *C08G 83/007* (2013.01); *C08L 5/16* (2013.01)

(58) Field of Classification Search
None
See application file for complete search history.

(56) References Cited

U.S. PATENT DOCUMENTS

2009/0088546 A1 4/2009 Ito et al.
2009/0312490 A1 12/2009 Ito et al.

(Continued)

FOREIGN PATENT DOCUMENTS

CN 1886440 A 12/2006
EP 1 707 587 A1 10/2006

(Continued)

OTHER PUBLICATIONS

Valeur et al. "Amide bond formation: beyond the myth of coupling reagents". Chemical Society Reviews, vol. 38, pp. 606-631, 2009.

(Continued)

*Primary Examiner* — Layla Berry
(74) *Attorney, Agent, or Firm* — Hamre, Schumann, Mueller & Larson, P.C.

(57) ABSTRACT

The present invention aims to provide a method for producing a polyrotaxane which enables industrially advantageous production of a polyrotaxane with a high inclusion rate.
The present invention relates to a method for producing a polyrotaxane that includes a cyclodextrin; a compound having a repeating structural unit represented by the following formula (1), and threading through a cavity of the cyclodextrin in a skewered manner to be included in the cyclodextrin; and capping groups individually placed at each end of a molecule of the compound having a repeating structural unit represented by the formula (1) to prevent the cyclodextrin from separating, the method comprising: a step 1 of mixing the compound having a repeating structural unit represented by the formula (1) and the cyclodextrin in an aqueous medium to prepare an aqueous dispersion of pseudopolyrotaxan particles in which the compound having a repeating structural unit represented by the formula (1) is included in a cavity of a cyclodextrin molecule in a skewered manner; and a step 2 of mixing a triazine compound represented by the formula (2), a compound having at least one tertiary amino group, the aqueous dispersion of pseudopolyrotaxane particles prepared in the step 1, and a capping agent to introduce capping groups individually at each end of a molecule of the compound having a repeating structural unit represented by the formula (1) in the pseudopolyrotaxane particles,

[Chem. 1]

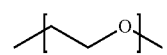

(1)

[Chem. 2]

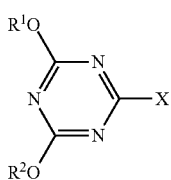

(2)

wherein, in the formula (2), $R^1$ and $R^2$ are each independently a C1-C4 alkyl group or a C6-C8 aryl group, and X represents a halogen atom.

16 Claims, No Drawings

(56) References Cited

U.S. PATENT DOCUMENTS

2010/0209347 A1   8/2010   Hattori
2014/0066403 A1   3/2014   Yamasaki et al.
2015/0051390 A1   2/2015   Yokota et al.

FOREIGN PATENT DOCUMENTS

| JP | 2005-154675 | 6/2005 |
| JP | 2005-255672 | 9/2005 |
| WO | 2005/080469 | 9/2005 |
| WO | 2009/041666 | 4/2009 |
| WO | 2012/124220 | 9/2012 |
| WO | 2013/147301 | 10/2013 |

OTHER PUBLICATIONS

Shinohara et al. "Small-Angle X-ray Scattering Study of the Pulley Effect of Slide-Ring Gels", Macromolecules, vol. 39, pp. 7386-7391, 2006.

Araki et al. "Efficient Production of Polyrotaxanes from alpha-Cyclodextrin and Poly(ethylene glycol)", Macromolecules, vol. 38, pp. 77524-7527, 2005.

Okumura et al. "The Polyrotaxane Gel: A Topological Gel by Figure-of-Eight Cross-links", Advanced Materials, vol. 13, No. 7, pp. 485-487, Apr. 4, 2001.

METHOD FOR MANUFACTURING POLYROTAXANE

TECHNICAL FIELD

The present invention relates to a method for producing a polyrotaxane.

BACKGROUND ART

Crosslinked polyrotaxanes are produced by crosslinking polyrotaxanes in which capping groups are individually introduced at each end of a pseudopolyrotaxane. For example, in cases where a pseudopolyrotaxane comprises a compound having a polyethylene glycol (hereinafter, also referred to as "PEG") chain (hereinafter, also referred to as a "PEG compound") and a cyclodextrin that includes the PEG compound, the resulting crosslinked polyrotaxane has a structure in which a PEG chain of the PEG compound threads through the cyclodextrin in a skewered manner and the cyclodextrin is movable along the PEG chain by a pulley effect. The pulley effect allows the crosslinked polyrotaxane to uniformly distribute tensile force applied thereto. The crosslinked polyrotaxane is therefore not likely to have cracks or flaws, i.e., has excellent characteristics that conventional crosslinked polymers do not have.

Patent Literature 1 discloses a method for producing a polyrotaxane including: dissolving separately carboxylated polyethylene glycol having a PEG chain in which both end groups are carboxylated and α-cyclodextrin in warm water at 70° C., mixing the solutions together and cooling the mixture to prepare an aqueous dispersion of pseudopolyrotaxane, freeze-drying the aqueous dispersion to prepare a pseudopolyrotaxane, and reacting the resulting pseudopolyrotaxane with adamantanamine in dimethylformamide in the presence of a BOP reagent (benzotriazole-1-yl-oxy-tris(dimethylamino)phosphonium hexafluorophosphate) as a condensing agent and diisopropylethylamine as a catalyst.

CITATION LIST

Patent Literature

Patent Literature 1: JP 2005-154675 A

SUMMARY OF INVENTION

Technical Problem

A pseudopolyrotaxane used for production of a polyrotaxane, which is generally produced by mixing a PEG compound and a cyclodextrin in an aqueous medium, is obtained in the form of an aqueous dispersion. Efficient formation of a polyrotaxane by introducing capping groups individually at each end of a pseudopolyrotaxane with a chemically stable bond can be achieved by reaction between carboxylated ends of a PEG chain and groups reactive with a carboxyl group, such as amino or hydroxyl, as capping groups.

Such a reaction to introduce capping groups individually at each end of a pseudopolyrotaxane is however inactivated by water in the system. The reaction therefore requires the absence of water or the water content controlled to an extremely slight amount in the reaction system for efficient proceeding thereof. In other words, the aqueous dispersion of pseudopolyrotaxane requires sufficient removal of water by drying the aqueous dispersion after solid-liquid separation by, for example, centrifugation or filtration, or drying without such separation.

In conventional methods for producing polyrotaxanes, water, which inhibits introduction of capping groups individually at each end of a PEG chain, needs to be sufficiently removed by drying. Therefore, the methods require an extremely long drying time.

Another problem is that, if water is present in the system, a cyclodextrin is separated by long-time heating even at a drying temperature of 70° C. or lower. Therefore, the inclusion rate of a polyrotaxane is reduced.

Further, another problem is that a process is complicated because a pseudopolyrotaxane aggregated by drying needs to be crushed or classified into a powder before introduction of capping groups individually at each end of polyethylene glycol.

It is an object of the present invention to provide a method for producing a polyrotaxane in which a polyrotaxane with a high inclusion rate can be industrially advantageously produced.

Solution to Problem

The present invention is a method for producing a polyrotaxane that includes a cyclodextrin; a compound having a repeating structural unit represented by the following formula (1), and threading through a cavity of the cyclodextrin in a skewered manner to be included in the cyclodextrin; and capping groups individually placed at each end of a molecule of the compound having a repeating structural unit represented by the formula (1) to prevent the cyclodextrin from separating, the method comprising:

a step 1 of mixing the compound having a repeating structural unit represented by the formula (1) and the cyclodextrin in an aqueous medium to prepare an aqueous dispersion of pseudopolyrotaxan particles in which the compound having a repeating structural unit represented by the formula (1) is included in a cavity of a cyclodextrin molecule in a skewered manner; and a step 2 of mixing a triazine compound represented by the formula (2), a compound having at least one tertiary amino group, the aqueous dispersion of pseudopolyrotaxane particles prepared in the step 1, and a capping agent to introduce capping groups individually at each end of a molecule of the compound having a repeating structural unit represented by the formula (1) in the pseudopolyrotaxane particles,

[Chem. 1]

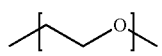

(1)

[Chem. 2]

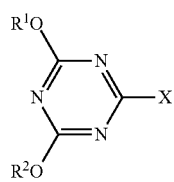

(2)

In the formula (2), $R^1$ and $R^2$ are each independently a C1-C4 alkyl group or a C6-C8 aryl group, and X represents a halogen atom.

The present invention is described in detail below.

The present inventors have found that a polyrotaxane with a high inclusion rate can be industrially advantageously produced without drying an aqueous dispersion of pseudopolyrotaxane by mixing and reacting a triazine compound represented by the formula (2), a compound having at least one tertiary amino group, an aqueous dispersion of pseudopolyrotaxane, and a capping agent, and introducing capping groups individually at each end of a polyethylene glycol chain of the pseudopolyrotaxane. In this manner, the present invention has been completed.

The method for producing a polyrotaxane of the present invention comprises a step 1 of mixing the compound having a repeating structural unit represented by the formula (1) and the cyclodextrin in an aqueous medium to prepare an aqueous dispersion of pseudopolyrotaxan particles in which the compound having a repeating structural unit represented by the formula (1) is included in a cavity of a cyclodextrin molecule in a skewered manner.

The compound having a repeating structural unit represented by the formula (1 has a mass average molecular weight of preferably, 1000 to 500000, more preferably 100 to 300000, and still more preferably 10000 to 100000. If the compound having a repeating structural unit represented by the formula (1) has a mass average molecular weight of less than 1000, a crosslinked polyrotaxane to be obtained by crosslinking the resulting polyrotaxanes may not sufficiently exert properties of being less likely to generate cracks or flaws. If the compound having a repeating structural unit represented by the formula (1) has a mass average molecular weight of more than 500000, the aqueous dispersion of pseudopolyrotaxane has low fluidity, and may be difficult to uniformly mix by stirring in the step 2.

The mass average molecular weight used herein is a polyethylene glycol equivalent value calculated based on the measurement by gel permeation chromatography (GPC). A column used for determination of a polyethylene glycol equivalent mass average molecular weight by GPC is, for example, TSKgel SuperAWM-H (produced by TOSOH CORPORATION).

The compound having a repeating structural unit represented by the formula (1) preferably has reactive groups individually at each end of the compound. The reactive groups can be introduced individually at each end of the compound having a repeating structural unit represented by the formula (1) by a conventionally known method.

The reactive group can be appropriately changed depending on the type of the capping group to be used. Examples of the reactive group include, but are not particularly limited to, hydroxyl group, amino group, carboxyl group, and thiol group. Carboxyl group is particularly preferred. Further, the reactive groups individually at each end are preferably the same and hydroxyl groups, carboxyl groups, or amino groups, and more preferably carboxyl groups.

Carboxyl groups are introduced at each end of the compound having a repeating structural unit represented by the formula (1) by, for example, a method of oxidizing each end of polyethylene glycol using TEMPO (2,2,6,6-tetramethyl-1-piperidinyloxy radical) and sodium hypochlorite.

In the step 1, the mass ratio of the compound having a repeating structural unit represented by the formula (1) to the cyclodextrin (compound having a repeating structural unit represented by the formula (1):cyclodextrin) is preferably 1:2 to 1:5, more preferably 1:2.5 to 1:4.5, and still more preferably 1:3 to 1:4. A mass of the cyclodextrin of less than twice the mass of the compound having a repeating structural unit represented by the formula (1) may decrease the number (i.e., inclusion amount) of cyclodextrin molecules including the compound having a repeating structural unit represented by the formula (1). A mass of the cyclodextrin of more than five times the mass of the compound having a repeating structural unit represented by the formula (1) may not increase the inclusion amount further, and thus is not economical.

Examples of the cyclodextrin include α-cyclodextrin, β-cyclodextrin, γ-cyclodextrin, and derivatives of these. In particular, α-cyclodextrin is preferred in terms of inclusion properties. Each of these cyclodextrins may be used alone, or two or more of these may be used in combination.

Examples of the aqueous medium include aqueous organic solvents such as dimethylformamide, dimethylacetamide, dimethyl sulfoxide, acetone, methyl ethyl ketone, methanol, ethanol, isopropanol, ethylene glycol, propylene glycol, glycerin, and tetrahydrofuran; water; and mixed solvents of water and the aqueous organic solvents. In particular, water and mixed solvents of water and each of the aqueous organic solvents are preferred. Water is more preferred in terms of inclusion properties.

The compound having a repeating structural unit represented by the formula (1) and the cyclodextrin may be mixed in the step 1 under the condition that they are mixed with each other in the aqueous medium, and are preferably dissolved in the aqueous medium. Specifically, the compound having a repeating structural unit represented by the formula (1) and the cyclodextrin are dissolved in the aqueous medium by heating typically to 50 to 100° C., preferably to 60 to 90° C., and more preferably to 70 to 80° C. Thus, a substantially transparent mixed solution can be obtained.

Cooling the mixed solution of the compound having a repeating structural unit represented by the formula (1) and the cyclodextrin precipitates pseudopolyrotaxane particles of the compound having a repeating structural unit represented by the formula (1) and the cyclodextrin, resulting in a basically white aqueous dispersion of pseudopolyrotaxane particles.

Pseudopolyrotaxane particles precipitated by continuously or intermittently cooling the mixed solution while flowing the solution can provide an aqueous dispersion of pseudopolyrotaxane with favorable fluidity which is not reduced with time. Use of such an aqueous dispersion of pseudopolyrotaxane enables uniform mixing by stirring in the step 2. Accordingly, a capping reaction can be easily completed.

If pseudopolyrotaxane particles are precipitated by cooling the mixed solution in a stationary state, a resulting aqueous dispersion of pseudopolyrotaxane is in the form of paste or cream, which has very low fluidity, or in the form of gel, which has no fluidity. Since even such an aqueous dispersion of pseudopolyrotaxane in the form of paste or cream loses its fluidity with time, it is preferable to fluidize the aqueous dispersion by stirring and mixing under suitable conditions before the step 2.

The mixed solution is cooled to an end-point temperature of preferably 0 to 30° C., more preferably 1 to 20° C., and still more preferably 1 to 15° C. An end-point temperature of the mixed solution of lower than 0° C. may freeze the aqueous dispersion of pseudopolyrotaxane to decrease the fluidity. An end-point temperature of the mixed solution of higher than 30° C. may not allow sufficient precipitation of pseudopolyrotaxane particles.

The mixed solution is cooled at a cooling speed of preferably 0.01 to 30° C./min, more preferably 0.05 to 20° C./min, and still more preferably 0.05 to 10° C./min. If a cooling speed of the mixed solution is lower than 0.01°

C./min, too fine pseudopolyrotaxane particles precipitate, resulting in a decrease in fluidity of the aqueous dispersion of pseudopolyrotaxane. As a result, the aqueous dispersion may be difficult to mix by stirring in the step 2. If a cooling speed of the mixed solution is higher than 30° C./min, large pseudopolyrotaxane particles are produced, resulting in a decrease in the reaction rate in the step 2. As a result, the yield of a polyrotaxane may decrease.

For more thorough precipitation of pseudopolyrotaxane particles, intermittent cooling may be performed as described above. Also, the flowing state of the mixed solution can be changed by changing the cooling speed during the cooling or the stirring conditions of the mixed solution.

The time for retaining the flowing state of the aqueous dispersion of pseudopolyrotaxane after the mixed solution is cooled to a desired temperature is typically several seconds to one week, and preferably several hours to three days.

The method of flowing the mixed solution during the cooling may be a known method such as stirring with a stirring blade and ultrasonic irradiation.

The degree of flowing of the mixed solution is not particularly limited, and may be optionally selected from the range of slight flowing of the mixed solution caused by gentle stirring to strong flowing caused by vigorous stirring using a homogenizer and the like. Excessively weak flowing may precipitate large pseudopolyrotaxane particles, which decreases the reaction rate in the step 2, leading to a reduction in the yield of polyrotaxane. In contrast, excessively strong flowing may precipitate very fine pseudopolyrotaxane particles, leading to a reduction in the fluidity of the resulting aqueous dispersion of pseudopolyrotaxane. As a result, the aqueous dispersion may be difficult to mix by stirring in the step 2.

If the mixed solution is cooled without flowing, an aqueous dispersion of pseudopolyrotaxane in the form of gel, which has very low fluidity or no fluidity, is obtained.

The volume average particle size of the pseudopolyrotaxane particles in the aqueous dispersion of pseudopolyrotaxane varies depending on the cooling speed, the end-point temperature after the cooling, and the flowing state of the mixed solution during the cooling. The volume average particle size is preferably 1 to 200 μm, more preferably 1 to 100 μm, and still more preferably 1 to 50 μm, in terms of fluidity and the dispersion stability of the aqueous dispersion of pseudopolyrotaxane. If the volume average particle size of the pseudopolyrotaxane particles is less than 1 μm, the dispersion may show decreased fluidity or no fluidity. As a result, the dispersion may be difficult to mix by stirring in the step 2. If the volume average particle size of the pseudopolyrotaxane particles is more than 200 μm, the reaction rate in the step 2 decreases, which may lead to a reduction in the yield of polyrotaxane.

The volume average particle size of the pseudopolyrotaxane particles in the aqueous dispersion of pseudopolyrotaxane herein can be analyzed using a laser diffraction particle size analyzer.

The pseudopolyrotaxane concentration of the aqueous dispersion of pseudopolyrotaxane prepared in the step 1 (hereinafter, also referred to as a solid concentration of the aqueous dispersion of pseudopolyrotaxane) is preferably 5% to 25% by mass, more preferably 5% to 20% by mass, and still more preferably 10% to 20% by mass. A solid concentration of the aqueous dispersion of pseudopolyrotaxane of lower than 5% by mass is not economical. A solid concentration of the aqueous dispersion of pseudopolyrotaxane of higher than 25% by mass may decrease the fluidity of the aqueous dispersion of pseudopolyrotaxane.

The method for producing a polyrotaxane of the present invention comprises a step 2 of mixing a triazine compound represented by the formula (2), a compound having at least one tertiary amino group, the aqueous dispersion of pseudopolyrotaxane prepared in the step 1, and a capping agent, and introducing capping groups individually at each end of the compound having a repeating structural unit represented by the formula (1) in the pseudopolyrotaxane.

By mixing and reacting the triazine compound represented by the formula (2), the compound having at least one tertiary amino group, the aqueous dispersion of pseudopolyrotaxane prepared in the step 1 and the capping agent, a drying step, which has been conventionally performed, may be skipped. Moreover, separation of cyclodextrin, which is likely to occur in a drying step, can be avoided. Therefore, a polyrotaxane having a high inclusion rate can be obtained. Further, agglomeration of a pseudopolyrotaxane due to a drying step can be prevented, and steps such as grinding and classifying can therefore be omitted. Accordingly, a polyrotaxane having a high inclusion rate can be produced by a simpler process.

In the triazine compound represented by the formula (2), $R^1$ and $R^2$ are each independently a C1-C4 alkyl group or a C6-C8 aryl group.

Examples of a C1-C4 alkyl group represented by $R^1$ or $R^2$ include methyl group, ethyl group, n-propyl group, isopropyl group, and n-butyl group. Examples of a C6-C8 aryl group include phenyl group, tolyl group, and xylyl group.

In the triazine compound represented by the formula (2), X represents a halogen atom.

Examples of the halogen atom include fluorine, chlorine, bromine, and iodine. In particular, chlorine is preferred because the triazine compound is readily synthesized.

Examples of the triazine compound represented by the formula (2) include 2-chloro-4,6-dimethoxy-1,3,5-triazine, 2-chloro-4,6-diethoxy-1,3,5-triazine, 2-chloro-4,6-di-n-propoxy-1,3,5-triazine, 2-chloro-4,6-diisopropoxy-1,3,5-triazine, 2-chloro-4,6-di-n-butoxy-1,3,5-triazine, and 2-chloro-4,6-diphenoxy-1,3,5-triazine. In particular, 2-chloro-4,6-dimethoxy-1,3,5-triazine, 2-chloro-4,6-diethoxy-1,3,5-triazine, and 2-chloro-4,6-diphenoxy-1,3,5-triazine are preferred because they are readily synthesized. In particular, 2-chloro-4,6-dimethoxy-1,3,5-triazine is more preferred. Some of these triazine compounds are available as an industrial material. In general, a triazine compound can be produced by reacting cyanuric chloride with a corresponding alcohol in the presence of potassium carbonate (or sodium hydrogen carbonate or the like) and a phase-transfer catalyst.

The amount of the triazine compound represented by the formula (2) to be used can be appropriately determined depending on the type of the end group of the compound having a repeating structural unit represented by the formula (1) and the type of the capping agent. The triazine compound is used in an amount of preferably 0.7 to 50 times the number of moles of the end groups of the compound having a repeating structural unit represented by the formula (1), more preferably 0.9 to 50 times, and still more preferably 1.5 to 40 times. If the triazine compound represented by the formula (2) is used in an amount of less than 0.7 times the number of moles of the end groups of the compound having a repeating structural unit represented by the formula (1), a condensation reaction does not complete to possibly reduce the yield of the polyrotaxane. Meanwhile, use of the triazine compound represented by the formula (2) even in an amount of more than 50 times the number of moles of the end groups of the compound having a repeating structural unit represented by the formula (1) does not give a stronger effect, and thus is not economical.

Examples of the compound having at least one tertiary amino group include aliphatic tertiary amines such as a morpholine compound represented by the following formula (3), N-methylpyrrolidine, N-ethylpyrrolidine, N-methylpiperidine, N-ethylpiperidine, N-methylindoline, N-methylisoindoline, triethylamine, tributylamine, N,N-dimethylisopropylamine, N,N-dimethylcyclohexylamine, N,N-diisopropylmethylamine, N,N-diisopropylethylamine, and N,N,N',N'-tetramethylethylenediamine; aliphatic tertiary diamines such as N,N,N',N'-tetramethylpropanediamine, N,N,N',N'-tetramethylbutanediamine, 1,4-dimethylpiperazine, and 1,4-diethylpiperazine; aromatic tertiary amines such as pyridine, N,N-dimethylaniline, N,N-diethylaniline, N,N-dimethylbenzylamine, N,N-diethylbenzylamine, N-methylindole, N-methylisoindole, N-methylpyrrole, indolizine, and N-methylcarbazole; and aromatic tertiary diamines.

[Chem. 3]

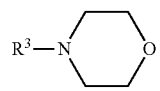

(3)

In the formula (3), $R^3$ represents a C1-C4 alkyl group.

Examples of a C1-C4 alkyl group represented by $R^3$ include methyl group, ethyl group, n-propyl group, isopropyl group, and n-butyl group.

Among the compounds having at least one tertiary amino group, a morpholine compound represented by the formula (3), N,N-diisopropylethylamine, and 1,4-dimethylpiperazine are preferred because they are readily available industrially and provide a polyrotaxane in a high yield. N-methylmorpholine represented by the formula (3) in which $R^3$ is methyl is more preferred.

In the step 2, the compound having at least one tertiary amino group is used in an amount of preferably 0.1 to 3 mol per mole of the triazine compound represented by the formula (2), more preferably 0.5 to 2 mol, and still more preferably 0.7 to 1.5 mol. If the compound having at least one tertiary amino group is used in an amount of less than 0.1 mol per mole of the triazine compound represented by the formula (2), the condensation reaction may not complete. Use of the compound having at least one tertiary amino group even in an amount of more than 3 mol per mole of the triazine compound represented by the formula (2) does not give a stronger effect, and thus is not economical.

In the step 2, the triazine compound represented by the formula (2), the compound having at least one tertiary amino group, the aqueous dispersion of pseudopolyrotaxane, and the capping agent may be mixed by any method. The capping agent, the triazine compound represented by the formula (2), and the compound having at least one tertiary amino group may be added as they are to the aqueous dispersion of pseudopolyrotaxane prepared in the step 1 and mixed, or they may be each preliminary dispersed or dissolved in water or a solvent before addition to the aqueous dispersion. Further, the capping agent, the triazine compound represented by the formula (2), and the compound having at least one tertiary amino group may be added separately or as a mixture to the aqueous dispersion of pseudopolyrotaxane.

In the step 2, the aqueous dispersion of pseudopolyrotaxane, the capping agent, the triazine compound represented by the formula (2), and the compound having at least one tertiary amino group may be added in any order. For easy preparation of a polyrotaxane with high yield, the method is preferred in which the triazine compound represented by the formula (2) and the compound having at least one tertiary amino group are added to the aqueous dispersion of pseudopolyrotaxane to convert the end of the compound having a repeating structural unit represented by the formula (1) into an active ester, and the capping agent is then added at one time, intermittently, or gradually to the aqueous dispersion.

The step 2 may include a step 2-1 of preparing a quaternary ammonium salt represented by the formula (4) by mixing and reacting the triazine compound represented by the formula (2) and the compound having at least one tertiary amino group; and a step 2-2 of mixing the quaternary ammonium salt represented by the formula (4), the aqueous dispersion of pseudopolyrotaxane prepared in the step 1, and the capping agent.

[Chem. 4]

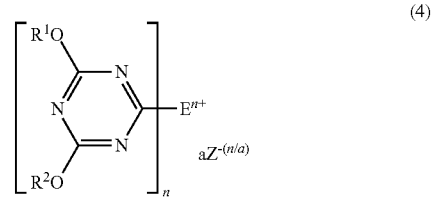

(4)

In the formula (4), E is an organic group containing one or two tertiary amino groups, and a monovalent or divalent organic group attached to a triazine ring via a nitrogen atom of the one or two tertiary amino groups; n is 1 when E contains one tertiary amino group, or is 2 when E contains two tertiary amino groups; $R^1$ and $R^2$ each independently represent a C1-C4 alkyl group or a C6-C8 aryl group; a is 1 or 2, and is 1 when n is 1; and $Z^{-(n/a)}$ represents a counter anion having a valence of (n/a).

The quaternary ammonium salt represented by the formula (4) has one or two chemical structures, in a molecule, in which a triazine ring is attached to a quaternary nitrogen atom. The triazine ring is a 1,3,5-triazine ring having a chemical structure in which the 4-position and the 6-position are substituted with an alkoxy group or aryloxy group, and the ring is attached to the quaternary nitrogen atom at the 2-position.

To the quaternary nitrogen atom are attached the triazine ring and three carbon atoms (or two carbon atoms when one carbon atom is attached to the quaternary nitrogen atom with a double bond). These carbon atoms may be each contained in different three organic groups, or may be contained in one or two organic groups.

In the quaternary ammonium salt represented by the formula (4), $R^1$ and $R^2$ are each independently a C1-C4 alkyl group or a C6-C8 aryl group.

Examples of a C1-C4 alkyl group represented by $R^1$ or $R^2$ include methyl group, ethyl group, n-propyl group, isopropyl group, and n-butyl group. Examples of a C6-C8 aryl group include phenyl group, tolyl group, and xylyl group.

Among the quaternary ammonium salts represented by the formula (4), quaternary ammonium salts in which each of $R^1$ and $R^2$ is methyl group, ethyl group, or phenyl group are preferred.

In the formula (4), n is 1 when E contains one tertiary amino group, or is 2 when E contains two tertiary amino groups; a is 1 or 2, and is 1 when n is 1; and $Z^{-(n/a)}$ represents a counter anion having a valence of (n/a), i.e. a monovalent or divalent counter anion.

In the formula (4), examples of the monovalent or divalent counter anion represented by $Z^{-(n/a)}$ include halide ions, a perchlorate ion, a tetrafluoroborate anion, a sulfate anion, and a carbonate anion. Examples of the halide ions include fluoride ions, chloride ions, bromide ions, and iodide ions. In the formula (4), a is 2 when n is 2 and the counter anion is monovalent. The two counter anions may be different in type from each other.

The quaternary ammonium salt represented by the formula (4) may be produced by a known method. For example, a quaternary ammonium salt represented by the formula (4) in which Z is a chloride ion can be produced by reacting the triazine compound represented by the formula (2) in which X is a chlorine atom with the compound having at least one tertiary amino group in an organic solvent, and separating precipitated crystals by filtration.

The quaternary ammonium salt represented by the formula (4) in which Z is a perchlorate anion can be produced by adding sodium perchlorate simultaneously when the triazine compound represented by the formula (2) in which X is a chlorine atom is reacted with the compound having at least one tertiary amino group in an organic solvent.

Further, the quaternary ammonium salt represented by the formula (4) in which Z is a tetrafluoroborate anion can be produced by adding sodium tetrafluoroborate simultaneously when the triazine compound represented by the formula (2) in which X is a chlorine atom is reacted with the compound having at least one tertiary amino group in an organic solvent.

Use of sodium perchlorate and sodium tetrafluoroborate produces sodium chloride as a by-product. Such sodium chloride is contained in a product separated by filtration. However, in the present invention, sodium chloride may be present in the reaction system.

Specific examples of the quaternary ammonium salt represented by the formula (4) include 1-(4,6-dimethoxy-1,3,5-triazine-2-yl)-1-methylpiperidinium chloride, 1-(4,6-dimethoxy-1,3,5-triazine-2-yl)-1-methylpiperidinium perchlorate, 1-(4,6-dimethoxy-1,3,5-triazine-2-yl)-1-methylpiperidinium tetrafluoroborate, 1-(4,6-dimethoxy-1,3,5-triazine-2-yl)-1-ethylpiperidinium chloride, 1-(4,6-dimethoxy-1,3,5-triazine-2-yl)-1-ethylpiperidinium perchlorate, 1-(4,6-dimethoxy-1,3,5-triazine-2-yl)-1-ethylpiperidinium tetrafluoroborate, 1-(4,6-dimethoxy-1,3,5-triazine-2-yl)-1-methylpyrrolidinium chloride, 1-(4,6-dimethoxy-1,3,5-triazine-2-yl)-1-methylpyrrolidinium perchlorate, 1-(4,6-dimethoxy-1,3,5-triazine-2-yl)-1-methylpyrrolidinium tetrafluoroborate, 1-(4,6-dimethoxy-1,3,5-triazine-2-yl)-1-ethylpyrrolidinium chloride, 1-(4,6-dimethoxy-1,3,5-triazine-2-yl)-1-ethylpyrrolidinium perchlorate, 1-(4,6-dimethoxy-1,3,5-triazine-2-yl)-1-ethylpyrrolidinium tetrafluoroborate, (4,6-dimethoxy-1,3,5-triazine-2-yl)triethylammonium perchlorate, (4,6-dimethoxy-1,3,5-triazine-2-yl)triethylammonium tetrafluoroborate, (4,6-dimethoxy-1,3,5-triazine-2-yl) dimethylcyclohexylammonium perchlorate, (4,6-dimethoxy-1,3,5-triazine-2-yl)dimethylcyclohexylammonium tetrafluoroborate, (4,6-dimethoxy-1,3,5-triazine-2-yl)pyridinium perchlorate, (4,6-dimethoxy-1,3,5-triazine-2-yl)pyridinium tetrafluoroborate, (4,6-diethoxy-1,3,5-triazine-2-yl)pyridinium perchlorate, (4,6-diethoxy-1,3,5-triazine-2-yl)pyridinium tetrafluoroborate, (4,6-dimethoxy-1,3,5-triazine-2-yl)dimethylphenylammonium perchlorate, (4,6-dimethoxy-1,3,5-triazine-2-yl)dimethylphenylammonium tetrafluoroborate, (4,6-diethoxy-1,3,5-triazine-2-yl)dimethylphenylammonium perchlorate, (4,6-diethoxy-1,3,5-triazine-2-yl)dimethylphenylammonium tetrafluoroborate, (4,6-dimethoxy-1,3,5-triazine-2-yl)dimethyl benzyl ammonium perchlorate, (4,6-dimethoxy-1,3,5-triazine-2-yl)dimethyl benzyl ammonium tetrafluoroborate, (4,6-diethoxy-1,3,5-triazine-2-yl)dimethyl benzyl ammonium perchlorate, (4,6-diethoxy-1,3,5-triazine-2-yl)dimethyl benzyl ammonium tetrafluoroborate, 1,4-di(4,6-dimethoxy-1,3,5-triazine-2-yl)-1,4-dimethylpiperazinium dichloride, 1,4-di(4,6-dimethoxy-1,3,5-triazine-2-yl)-1,4-dimethylpiperazinium diperchlorate, 1,4-di(4,6-dimethoxy-1,3,5-triazine-2-yl)-1,4-dimethylpiperazinium ditetrafluoroborate, 1,4-di(4,6-diethoxy-1,3,5-triazine-2-yl)-1,4-dimethylpiperazinium dichloride, 1,4-di(4,6-diethoxy-1,3,5-triazine-2-yl)-1,4-dimethylpiperazinium diperchlorate, 1,4-di(4,6-diethoxy-1,3,5-triazine-2-yl)-1,4-dimethylpiperazinium ditetrafluoroborate, 1,4-di(4,6-di-n-propoxy-1,3,5-triazine-2-yl)-1,4-dimethylpiperazinium dichloride, 1,4-di(4,6-di-n-propoxy-1,3,5-triazine-2-yl)-1,4-dimethylpiperazinium diperchlorate, 1,4-di(4,6-di-n-propoxy-1,3,5-triazine-2-yl)-1,4-dimethylpiperazinium ditetrafluoroborate, 1,4-di(4,6-diphenoxy-1,3,5-triazine-2-yl)-1,4-dimethylpiperazinium dichloride, 1,4-(4,6-diphenoxy-1,3,5-triazine-2-yl)-1,4-dimethylpiperazinium diperchlorate, and quaternary ammonium salts represented by the formula (5). In particular, quaternary ammonium salts represented by the following formula (5) are preferred because they are readily synthesized.

[Chem. 5]

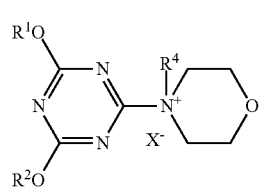

(5)

In the formula (5), $R^1$ and $R^2$ are each independently a C1-C4 alkyl group or a C6-C8 aryl group, $R^4$ is a C1-C4 alkyl group, and X represents a halogen atom.

In the formula (5), examples of a C1-C4 alkyl group represented by $R^1$ or $R^2$ include methyl group, ethyl group, n-propyl group, isopropyl group, and n-butyl group.

In the formula (5), examples of a C6-C8 aryl group represented by $R^1$ or $R^2$ include phenyl group, tolyl group, and xylyl group.

In the formula (5), examples of a C1-C4 alkyl group represented by $R^4$ include methyl group, ethyl group, n-propyl group, isopropyl group, and n-butyl group.

In particular, in the quaternary ammonium salts represented by the formula (5), a C1-C4 alkyl group represented by $R^1$ or $R^2$ is preferably methyl group or ethyl group, a C6-C8 aryl group is preferably phenyl group, and a C1-C4 alkyl group represented by $R^4$ is preferably methyl group or ethyl group in terms of a high inclusion rate.

Specific examples of the quaternary ammonium salt represented by the formula (5) include 4-(4,6-dimethoxy-1,3,5-triazine-2-yl)-4-methylmorpholinium chloride, 4-(4,6-dimethoxy-1,3,5-triazine-2-yl)-4-methylmorpholinium perchlorate, 4-(4,6-dimethoxy-1,3,5-triazine-2-yl)-4-methylmorpholinium tetrafluoroborate, 4-(4,6-diethoxy-1,3,5-triazine-2-yl)-4-methylmorpholinium perchlorate, 4-(4,6-diethoxy-1,3,5-triazine-2-yl)-4-methylmorpholinium tetrafluoroborate, 4-(4,6-di-n-propoxy-1,3,5-triazine-2-yl)-4-methylmorpholinium perchlorate, 4-(4,6-di-n-propoxy-1,3,5-triazine-2-yl)-4-methylmorpholinium tetrafluoroborate, 4-(4,6-diphenoxy-1,3,5-triazine-2-yl)-4-methylmorpholinium perchlorate, 4-(4,6-diphenoxy-1,3,5-triazine-2-yl)-4-methylmorpholinium tetrafluoroborate, 4-(4,6-dimethoxy-1,3,5-triazine-2-yl)-4-ethylmorpholinium perchlorate, 4-(4,6-dimethoxy-1,3,5-triazine-2-yl)-4-ethylmorpholinium tetrafluoroborate, 4-(4,6-diethoxy-1,3,5-triazine-2-yl)-4-ethylmorpholinium perchlorate, 4-(4,6-diethoxy-1,3,5-triazine-2-yl)-4-ethylmorpholinium tetrafluoroborate, 4-(4,6-di-n-propoxy-1,3,5-triazine-2-yl)-4-ethylmorpholinium perchlorate, 4-(4,6-di-n-propoxy-1,3,5-triazine-2-yl)-4-ethylmorpholinium tetrafluoroborate, 4-(4,6-diphenoxy-1,3,5-triazine-2-yl)-4-ethylmorpholinium perchlorate, and 4-(4,6-diphenoxy-1,3,5-triazine-2-yl)-4-ethylmorpholinium tetrafluoroborate.

The amount of the quaternary ammonium salt represented by the formula (4) to be used can be appropriately determined depending on the type of the end group of the compound having a repeating structural unit represented by the formula (1) and the type of the capping agent. The quaternary ammonium salt is used in an amount of preferably 0.7 to 50 times the number of moles of the end groups of the compound having a repeating structural unit represented by the formula (1), more preferably 0.9 to 50 times, and still more preferably 1.5 to 40 times. If the quaternary ammonium salt represented by the formula (4) is used in an amount of less than 0.7 times the number of moles of the end groups of the compound having a repeating structural unit represented by the formula (1), a condensation reaction may not complete to possibly reduce the yield of the polyrotaxane. Meanwhile, use of the quaternary ammonium salt represented by the formula (4) even in an amount of more than 50 times the number of moles of the end groups of the compound having a repeating structural unit represented by the formula (1) does not give a stronger effect, and thus is not economical.

In the step 2-2, the aqueous dispersion of pseudopolyrotaxane, the capping agent, and the quaternary ammonium salt represented by the formula (4) may be mixed by any method. The capping agent and the quaternary ammonium salt represented by the formula (4) prepared in the step 2-1 may be added as they are to the aqueous dispersion of pseudopolyrotaxane prepared in the step 1 and mixed, or they may be each preliminary dispersed or dissolved in water or a solvent before addition to the aqueous dispersion. Further, the capping agent and the quaternary ammonium salt represented by the formula (4) may be added separately or as a mixture to the aqueous dispersion of pseudopolyrotaxane.

In the step 2-2, the capping agent and the quaternary ammonium salt represented by the formula (4) may be added in any order. For preparation of a polyrotaxane with a high yield, the method is preferred in which the quaternary ammonium salt represented by the formula (4) prepared in the step 2-1 is added to the aqueous dispersion of pseudopolyrotaxane to convert the end of the compound having a repeating structural unit represented by the formula (1) into an active ester, and the capping agent is then added at one time, intermittently, or gradually to the aqueous dispersion.

In order to carry out the reaction smoothly in the step 2-2, the compound having at least one tertiary amino group is preferably added as a catalyst, and a morpholine compound represented by the formula (3) is more preferably added.

In the step 2-2, the compound having at least one tertiary amino group is used in an amount of preferably 0.01 to 3 mol per mole of the quaternary ammonium salt represented by the formula (4), more preferably 0.05 to 2 mol, and still more preferably 0.1 to 1 mol. If the compound having at least one tertiary amino group is used in an amount of less than 0.01 mol per mole of the quaternary ammonium salt represented by the formula (4), the condensation reaction may not complete. Meanwhile, use of the compound having at least one tertiary amino group even in an amount of more than 3 mol per mole of the quaternary ammonium salt represented by the formula (4) does not give a stronger effect, and thus is not economical.

The capping agent may be any compound as long as it has a reactive group reactive with the end groups of the compound having a repeating structural unit represented by the formula (1), and capping groups by which a cyclodextrin of the resulting polyrotaxane is capped not to be separated from the compound included in the cyclodextrin in a skewered manner. The capping agent may be appropriately selected depending on the type of the end groups of the compound having a repeating structural unit represented by the formula (1). For example, in cases where the end group of the compound having a repeating structural unit represented by the formula (1) is carboxyl group, the reactive group of the capping agent is preferably amino group or hydroxyl group.

Examples of the capping group of the capping agent include dinitrophenyl group, adamantane group, anthracene group, trityl group, cyclodextrins, fluoresceins, pyrenes, and derivatives of these.

Specific examples of the capping agent include 2,4-dinitrophenylamine, 1-adamantanamine, a salt of 1-adamantanamine, 1-hydroxyadamantane, and 1-aminoanthracene. Preferred are 1-adamantanamine and adamantanamine salts such as adamantanamine hydrochloride in terms of the reactivity and stability of chemical bonds.

The amount of the capping agent to be used is determined depending on the conditions of a reaction to introduce capping groups individually at each end group of the compound having a repeating structural unit represented by the formula (1) of the pseudopolyrotaxane. The capping agent is used in an amount of preferably 1 to 50 times the number of moles of the end groups of the compound having a repeating structural unit represented by the formula (1), more preferably 2 to 50 times, and still more preferably 2 to 40 times. If the capping agent is used in an amount of less than 1 time the number of moles of the end groups of the compound having a repeating structural unit represented by the formula (1), introduction of a capping group is insufficient to possibly reduce the yield of the polyrotaxane. Meanwhile, use of the capping agent even in an amount of more than 50 times the number of moles of the end groups of the compound having a repeating structural unit represented by the formula (1) does not give a stronger effect, and thus is not economical.

The temperature of the step 2 is preferably 5 to 80° C., more preferably 10 to 80° C., and still more preferably 20 to 80° C. If the temperature is lower than 5° C., capping groups may be insufficiently introduced. If the temperature is higher than 80° C., a cyclodextrin in the pseudopolyrotaxane is separated from the pseudopolyrotaxane, which may lead to a reduction in the inclusion rate.

The capping groups can be usually introduced under atmospheric pressure, and can also be introduced under low pressure, ordinary pressure, or increased pressure.

Depending on the conditions, the step 2 usually requires 1 to 20 hours to complete the introduction of capping groups. If the amount of time spent on the step 2 is too small, introduction of capping groups at each end (group) of the compound having a repeating structural unit represented by the formula (1) is insufficient to possibly reduce the yield of the polyrotaxane.

In the present invention, the aqueous dispersion of pseudopolyrotaxane prepared in the step 1 may be reacted, without controlling the solid concentration thereof, with the capping agent, the triazine compound represented by the formula (2), and the compound having at least one tertiary amino group; or with the capping agent and the quaternary ammonium salt represented by the formula (4) prepared by mixing the triazine compound represented by the formula (2) and the compound having at least one tertiary amino group. Prior to the reaction with the capping agent, the triazine compound represented by the formula (2), and the compound having at least one tertiary amino group; or the reaction with the capping agent, the quaternary ammonium salt represented by the formula (4) prepared by mixing the triazine compound represented by the formula (2) and the compound having at least one tertiary amino group, the solid concentration of the aqueous dispersion of pseudopolyrotaxane may be suitably controlled by diluting the aqueous dispersion with an aqueous medium, or condensing the aqueous dispersion by centrifugation, filtration, or the like.

The solid concentration of the aqueous dispersion of pseudopolyrotaxane in the step 2 is preferably 5% to 40% by mass, more preferably 5% to 35% by mass, and still more preferably 10% to 30% by mass. An aqueous dispersion of pseudopolyrotaxane having a solid concentration of lower than 5% by mass is not economical. An aqueous dispersion of a pseudopolyrotaxane having a solid concentration of higher than 40% by mass is difficult to uniformly mix by stirring in the step 2. As a result, introduction of capping groups may not complete.

If the aqueous dispersion of pseudopolyrotaxane is condensed or dried by removing the aqueous medium by heating, a cyclodextrin may be separated, which may result in a reduction in the inclusion rate.

In the method for producing a polyrotaxane of the present invention, the step 2 is preferably performed in the presence of an inorganic salt and/or an aqueous organic solvent. Separation of the cyclodextrin is further suppressed during the reaction in the step 2 in the presence of an inorganic salt and/or an aqueous organic solvent. Therefore, industrially advantageous production of a polyrotaxane with a high inclusion rate is achieved.

The inorganic salt and/or the aqueous organic solvent may be added during either the step 1 or the step 2. In the step 2, a reaction is carried out in the state where the aqueous dispersion of pseudopolyrotaxane; the capping agent; a combination of the triazine compound represented by the formula (2) and the compound having at least one tertiary amino group, or the quaternary ammonium salt represented by the formula (4) prepared by mixing the triazine compound represented by the formula (2) and the compound having at least one tertiary amino group; and the inorganic salt and/or the aqueous organic solvent are mixed. The inorganic salt and/or the aqueous organic solvent are/is preferably added during the step 2 in terms of more efficient production of a polyrotaxane with a high inclusion rate.

Examples of the inorganic salt include alkali metal salts of inorganic acids such as potassium sulfate, sodium sulfate, potassium nitrate, sodium nitrate, potassium chloride, sodium chloride, dipotassium hydrogen phosphate, and sodium dihydrogen phosphate; alkaline-earth metal salts of inorganic acids such as calcium chloride; magnesium sulfate; aluminum sulfate; and aluminum chloride. Each of these inorganic salts may be used alone, or two or more of these may be used in combination.

Among the inorganic salts, potassium chloride, sodium chloride, potassium sulfate, and sodium sulfate are preferred because they efficiency suppress separation of the cyclodextrin. Sodium chloride and sodium sulfate are more preferred.

The amount of the inorganic salt to be used is not particularly limited, and can be appropriately determined depending on the types of the capping agent, the triazine compound represented by the formula (2) or the quaternary ammonium salt represented by the formula (4), and the compound having at least one tertiary amino group. The concentration of the inorganic salt in the total of the entire aqueous medium and the inorganic salt in the step 2 is preferably 1% by mass or more, and more preferably 10% by mass or more. If the concentration of the inorganic salt is less than 1% by mass, separation of the cyclodextrin may not be prevented.

The concentration of the inorganic salt is preferably not higher than the saturation concentration of the inorganic salt at the temperature of the step 2. Use of the inorganic salt in such an amount as to exceed the saturation concentration thereof at the temperature of the step 2 does not give a stronger effect, and thus is not economical.

The "entire aqueous medium" means, when an aqueous organic solvent is used together with an inorganic salt, an aqueous medium including the aqueous organic solvent.

Examples of the aqueous organic solvent preferably present in the step 2 include, but are not particularly limited to, aqueous organic solvents listed as the aqueous medium in the step 1. Each of these aqueous organic solvents may be used alone, or two or more of these may be used in combination.

such that the amount of

Among the aqueous organic solvents, an aqueous organic solvent that dissolves at most 10 g of the cyclodextrin in 100 g thereof at 25° C. is preferred because such a solvent efficiently suppresses separation of the cyclodextrin. Dimethylacetamide, acetone, methyl ethyl ketone, and tetrahydrofuran are more preferred.

The amount of the aqueous organic solvent to be used is not particularly limited, and can be appropriately determined depending on the types of the capping agent, the triazine compound represented by the formula (2) or the quaternary ammonium salt represented by the formula (4), and the compound having at least one tertiary amino group. The concentration of the aqueous organic solvent in the entire aqueous medium in the step 2 is preferably 5% to 95% by mass, more preferably 10% to 90% by mass, and still more preferably 20% to 80% by mass. If the concentration of the aqueous organic solvent in the entire aqueous medium is less than 5% by mass, separation of the cyclodextrin may be likely to occur. Meanwhile, use of an aqueous organic solvent with a concentration of more than 95% by mass does not give a stronger effect, and thus is not economical.

Depending on the application or intended use of the resulting polyrotaxane or crosslinked polyrotaxane, a polyrotaxane having an inclusion rate of 6 to 60% can be produced by the method for producing a polyrotaxane of the present invention. If the inclusion rate is lower than 6%, a pulley effect may not be shown. Meanwhile, if the inclusion rate is higher than 60%, cyclodextrin molecules, which are cyclic molecules, are densely arranged, which may lead to reduction in mobility. For appropriate mobility of the cyclodextrin molecules, the inclusion rate is preferably 15 to 40%, and more preferably 20 to 40%.

The "inclusion rate" used herein refers to a percentage of the inclusion amount of cyclodextrin molecules including the compound having a repeating structural unit represented by the formula (1) based on the maximum inclusion amount of cyclodextrin molecules including the compound having a repeating structural unit represented by the formula (1). The inclusion rate is optionally controllable by changing the mixing ratio of the compound having a repeating structural unit represented by the formula (1) to the cyclodextrin molecules or the type of an aqueous medium. The maximum inclusion amount refers to the number of cyclodextrin molecules in the case of the close-packed state in which one cyclodextrin molecule includes two repeating units of the compound having a repeating structural unit represented by the formula (1)

The inclusion rate can be measured by $^1$H-NMR. Specifically, a polyrotaxane prepared by introducing capping groups individually at each end of a pseudopolyrotaxane is dissolved in DMSO-$d_6$, and the resulting solution is measured using an NMR measuring device (e.g. VARIAN Mercury-400BB produced by Varian Technologies Japan Ltd.). An inclusion rate can be calculated by comparing the integrated value of a cyclodextrin peak at 4 to 6 ppm and the integrated value of a cyclodextrin peak and the compound having a repeating structural unit represented by the formula (1) peak at 3 to 4 ppm.

Advantageous Effects of Invention

The present invention can provide a method for producing a polyrotaxane which enables industrially advantageous production of a polyrotaxane with a high inclusion rate.

DESCRIPTION OF EMBODIMENTS

The present invention is described below in more detail based on examples which, however, are not intended to limit the scope of the present invention. A method of producing a compound having carboxyl groups introduced individually at each end of a PEG chain by oxidizing a PEG was described below. The method was performed in accordance with the method described in WO 05/052026.

Production Example 1

In a 1-L flask, 100 g of a PEG (mass average molecular weight 35000), 1 g of TEMPO (2,2,6,6-tetramethyl-1-piperidinyloxy radical), and 10 g of sodium bromide were dissolved in 1 L of water. To the solution was added 50 ml of an aqueous solution of sodium hypochlorite (available chlorine concentration 5%). The resulting solution was stirred at room temperature for 30 min. An amount of 50 mL of ethanol was added to decompose the excess of sodium hypochlorite, and the reaction was terminated.

An organic layer was isolated by repeating extraction with 500 mL of methylene chloride three times using a separatory funnel, and the methylene chloride was distilled off using an evaporator. The resulting substance was dissolved in 2 L of warm ethanol, and the solution was allowed to stand in a freezer (−4° C.) overnight, so that a compound having carboxyl groups individually at each end of a PEG chain was precipitated. The compound was collected and dried under reduced pressure. In this manner, 100 g of a compound having carboxyl groups individually at each end of a PEG chain was obtained.

Production Example 2

In a 1-L flask, 100 g of a high-molecular-weight PEG (mass average molecular weight 100000), 1 g of TEMPO (2,2,6,6-tetramethyl-1-piperidinyloxy radical), and 10 g of sodium bromide were dissolved in 1 L of water. To the solution was added 50 mL of an aqueous solution of sodium hypochlorite (available chlorine concentration 5%). The resulting solution was stirred at room temperature for 30 min. An amount of 50 mL of ethanol was added to decompose the excess of sodium hypochlorite, and the reaction was terminated.

An organic layer was isolated by repeating extraction with 500 mL of methylene chloride three times using a separatory funnel, and the methylene chloride was distilled off using an evaporator. The resulting substance was dissolved in 2 L of warm ethanol, and the solution was allowed to stand in a freezer (−4° C.) overnight, so that a compound having carboxyl groups individually at each end of a PEG chain was precipitated. The compound was collected and dried under reduced pressure. In this manner, 100 g of a compound having carboxyl groups individually at each end of a PEG chain was obtained.

Example 1

(1) Preparation of Aqueous Dispersion of Pseudopolyrotaxane

In a 1-L flask equipped with a stirrer, 20 g of the compound having carboxyl groups individually at each end of a PEG chain prepared by the method of Production Example 1 and 80 g of α-cyclodextrin were dissolved in 650 mL of water by heating to 70° C.

The solution was cooled to 5° C. at a cooling speed of 0.4° C./min while stirring with a stirring blade at a rotational speed of 700 rpm, and further stirred at the same temperature for 10 hours. In this manner, a milky aqueous dispersion of pseudopolyrotaxane having favorable fluidity (solid concentration 13.3% by mass) was obtained.

Measurement using a laser diffraction particle size analyzer showed that the pseudopolyrotaxane particles in the aqueous dispersion of pseudopolyrotaxane had a volume average particle size of 10 μm.

(2) Capping of Pseudopolyrotaxane

To 750 g of the prepared aqueous dispersion of pseudopolyrotaxane (solid concentration 13.3% by mass) was added 5.1 g (20 times the number of moles of the ends of the compound having carboxyl groups individually at each end of a PEG chain) of adamantanamine hydrochloride as a capping agent, 4.8 g (20 times the number of moles of the ends of the compound having carboxyl groups individually at each end of a PEG chain) of 2-chloro-4,6-dimethoxy-1,3,5-triazine, and 3.5 g (1.27 times the moles of 2-chloro-4,6-dimethoxy-1,3,5-triazine) of N-methylmorpholine while stirring at a rotational speed of 700 rpm using a stirring blade. The solution was heated to 60° C., and reacted for 4 hours at the same temperature. The prepared mixture was centrifuged to remove a supernatant to prepare a polyrotaxane in the form of liquid-containing cake. To the polyrotaxane was added 300 g of water. They were heated to 70° C. while stirring, and stirred for 60 min at the same temperature. The mixture was centrifuged again to remove a supernatant. Two more such washing operations were performed to give a purified polyrotaxane in the form of liquid-containing cake. The polyrotaxane was freeze-dried (dried at −10 to 20° C. for 48 hours). In this manner, 36 g of a polyrotaxane was obtained.

Example 2

The same procedure was performed as in Example 1, except that, in the step of "(2) Capping of pseudopolyrotaxane", the amount of 2-chloro-4,6-dimethoxy-1,3,5-triazine was 2.4 g (10 times the number of moles of the ends of the compound having carboxyl groups individually at each end of a PEG chain). In this manner, 18 g of a polyrotaxane was obtained.

Example 3

The same procedure was performed as in Example 1, except that, in the step of "(2) Capping of pseudopolyrotaxane", the amount of 2-chloro-4,6-dimethoxy-1,3,5-triazine was changed to 0.17 g (0.7 times the number of moles of the ends of the compound having carboxyl groups individually at each end of a PEG chain), and the amount of N-methylmorpholine was changed to 0.25 g (2.55 times the moles of 2-chloro-4,6-dimethoxy-1,3,5-triazine). In this manner, 16 g of a polyrotaxane was obtained.

Example 4

The same procedure was performed as in Example 1, except that, in the step of "(2) Capping of pseudopolyrotaxane", the amount of N-methylmorpholine was changed to 5.5 g (twice the moles of 2-chloro-4,6-dimethoxy-1,3,5-triazine). In this manner, 20 g of a polyrotaxane was obtained.

Example 5

The same procedure was performed as in Example 1, except that, in the step of "(2) Capping of pseudopolyrotaxane", the amount of 2-chloro-4,6-dimethoxy-1,3,5-triazine was changed to 14.4 g (60 times the number of moles of the ends of the compound having carboxyl groups individually at each end of a PEG chain), and the amount of N-methylmorpholine was changed to 12.6 g (1.5 times the moles of 2-chloro-4,6-dimethoxy-1,3,5-triazine). In this manner, 42 g of a polyrotaxane was obtained.

Example 6

The same procedure was performed as in Example 1, except that, in the step of "(2) Capping of pseudopolyrotaxane", the amount of adamantanamine hydrochloride was changed to 10.2 g (40 times the number of moles of the ends of the compound having carboxyl groups individually at each end of a PEG chain), the amount of 2-chloro-4,6-dimethoxy-1,3,5-triazine was changed to 9.6 g (40 times the number of moles of the ends of the compound having carboxyl groups individually at each end of a PEG chain), the amount of N-methylmorpholine was changed to 7.0 g (1.27 times the moles of 2-chloro-4,6-dimethoxy-1,3,5-triazine), and the reaction temperature was changed to 80° C. In this manner, 42 g of a polyrotaxane was obtained.

Example 7

The same procedure was performed as in Example 6, except that, in the step of "(2) Capping of pseudopolyrotaxane", 245 g (24.0% by mass of the amount of total ingredients charged in the steps of "(1) Preparation of aqueous dispersion of pseudopolyrotaxane" and "(2) Capping of pseudopolyrotaxane") of sodium chloride was further added and then a reaction was performed. In this manner, 58 g of a polyrotaxane was obtained.

Example 8

The same procedure was performed as in Example 1, except that, in the step of "(2) Capping of pseudopolyrotaxane", 100 g (11.6% by mass of the amount of total ingredients charged in the steps of "(1) Preparation of aqueous dispersion of pseudopolyrotaxane" and "(2) Capping of pseudopolyrotaxane") of sodium sulfate was further added and then a reaction was performed. In this manner, 52 g of a polyrotaxane was obtained.

Example 9

The same procedure was performed as in Example 1, except that, in the step of "(1) Preparation of aqueous dispersion of pseudopolyrotaxane", the prepared aqueous dispersion of pseudopolyrotaxane was centrifuged to remove a supernatant, water was added to the prepared pseudopolyrotaxane in the form of liquid-containing cake so that the concentration (solid concentration) of the pseudopolyrotaxane in the aqueous dispersion of pseudopolyrotaxane was controlled to 30% by mass, and the solution was mixed by stirring to prepare 330 g of an aqueous dispersion of pseudopolyrotaxane having a solid concentration of 30% by mass; and in the step of "(2) Capping of pseudopolyrotaxane", 330 g of the prepared aqueous dispersion of pseudopolyrotaxane (solid concentration 30% by mass) was used instead of 750 g of the aqueous dispersion of pseudopolyrotaxane (solid concentration 13.3% by mass). In this manner, 41 g of a polyrotaxane was obtained.

The volume average particle size of the pseudopolyrotaxane particles in the aqueous dispersion of pseudopolyrotaxane was 11 µm.

Example 10

The same procedure was performed as in Example 1, except that, in the step of "(1) Preparation of aqueous dispersion of pseudopolyrotaxane", the prepared aqueous dispersion of pseudopolyrotaxane was centrifuged to remove a supernatant, water and acetone were added to the prepared pseudopolyrotaxane in the form of liquid-containing cake so that the concentration of pseudopolyrotaxane (solid concentration) in the aqueous dispersion of pseudopolyrotaxane was controlled to 25% by mass, and the mass ratio of acetone to water was set to 1:1, and the solution was mixed by stirring to prepare 400 g of an aqueous dispersion of pseudopolyrotaxane having a solid concentration of 25% by mass; and in the step of "(2) Capping of pseudopolyrotaxane", 400 g of the prepared aqueous dispersion of pseudopolyrotaxane (solid concentration 25% by mass) was used instead of 750 g of the aqueous dispersion of pseudopolyrotaxane (solid concentration 13.3% by mass). In this manner, 48 g of a polyrotaxane was obtained.

The volume average particle size of the pseudopolyrotaxane particles in the aqueous dispersion of pseudopolyrotaxane was 11 µm.

Example 11

The same procedure was performed as in Example 10, except that, in the step of "(2) Capping of pseudopolyrotaxane", the amount of adamantanamine hydrochloride was changed to 0.31 g (1.2 times the number of moles of the ends of the compound having carboxyl groups individually at each end of a PEG chain), and the amount of N-methylmorpholine was changed to 2.8 g (equivalent amount to 2-chloro-4,6-dimethoxy-1,3,5-triazine). In this manner, 40 g of a polyrotaxane was obtained.

Example 12

The same procedure was performed as in Example 10, except that, in the step of "(1) Preparation of aqueous dispersion of pseudopolyrotaxane", water and dimethylacetamide were added instead of water and acetone to the prepared pseudopolyrotaxane in the form of liquid-containing cake. In this manner, 48 g of a polyrotaxane was obtained.

The volume average particle size of the pseudopolyrotaxane particles in the aqueous dispersion of pseudopolyrotaxane was 11 μm.

Example 13

The same procedure was performed as in Example 6, except that, in the step of "(1) Preparation of aqueous dispersion of pseudopolyrotaxane", the compound having carboxyl groups individually at each end of a PEG chain prepared by the method of Production Example 2 was used instead of the compound having carboxyl groups individually at each end of a PEG chain prepared by the method of Production Example 1, and in the step of "(2) Capping of pseudopolyrotaxane", the amount of adamantanamine hydrochloride was changed to 3.5 g (40 times the number of moles of the ends of the compound having carboxyl groups individually at each end of a PEG chain), the amount of 2-chloro-4,6-dimethoxy-1,3,5-triazine was changed to 3.5 g (40 times the number of moles of the ends of the compound having carboxyl groups individually at each end of a PEG chain), and the amount of N-methylmorpholine was changed to 2.5 g (1.25 times the moles of 2-chloro-4,6-dimethoxy-1,3,5-triazine). In this manner, 42 g of a polyrotaxane was obtained.

The volume average particle size of the pseudopolyrotaxane particles in the aqueous dispersion of pseudopolyrotaxane was 12 μm.

Example 14

The same procedure was performed as in Example 10, except that, in the step of "(2) Capping of pseudopolyrotaxane", 5.1 g (30 times the number of moles of the ends of the compound having carboxyl groups individually at each end of a PEG chain) of 1-hydroxyadamantane was added instead of the adamantanamine hydrochloride as a capping agent. In this manner, 26 g of a polyrotaxane was obtained.

Example 15

(1) Preparation of Aqueous Dispersion of Pseudopolyrotaxane

A milky aqueous dispersion of pseudopolyrotaxane with favorable fluidity (solid concentration 13.3% by mass) was obtained in the same manner as in Example 1.

Measurement using a laser diffraction particle size analyzer showed that the particles in the aqueous dispersion of pseudopolyrotaxane had a volume average particle size of 10 μm.

(2) Capping of Pseudopolyrotaxane

To 750 g of the prepared aqueous dispersion of pseudopolyrotaxane (solid concentration 13.3% by mass) was added 5.1 g (20 times the number of moles of the ends of the compound having carboxyl groups individually at each end of a PEG chain) of adamantanamine hydrochloride as a capping agent, and 7.6 g (20 times the number of moles of the ends of the compound having carboxyl groups individually at each end of a PEG chain) of 4-(4,6-dimethoxy-1,3,5-triazine-2-yl)-4-methylmorpholinium chloride preliminarily prepared by mixing and reacting 4.8 g of 2-chloro-4,6-dimethoxy-1,3,5-triazine and 2.8 g of N-methylmorpholine while stirring at a rotational speed of 700 rpm using a stirring blade. The solution was heated to 60° C., and reacted for 4 hours at the same temperature. The prepared mixture was centrifuged to remove a supernatant to prepare a polyrotaxane in the form of liquid-containing cake. To the polyrotaxane was added 300 g of water. They were heated to 70° C. while stirring, and stirred for 60 min at the same temperature. The mixture was centrifuged again to remove a supernatant. Two more such washing operations were performed to give a purified polyrotaxane in the form of liquid-containing cake. The polyrotaxane was freeze-dried (dried at −10 to 20° C. for 48 hours). In this manner, 14 g of a polyrotaxane was obtained.

Example 16

The same procedure was performed as in Example 15, except that, in the step of "(2) Capping of pseudopolyrotaxane", the amount of adamantanamine hydrochloride was changed to 10.2 g (40 times the number of moles of the ends of the compound having carboxyl groups individually at each end of a PEG chain), the amount of 4-(4,6-dimethoxy-1,3,5-triazine-2-yl)-4-methylmorpholinium chloride was changed to 15.2 g (40 times the number of moles of the ends of the compound having carboxyl groups individually at each end of a PEG chain). In this manner, 18 g of a polyrotaxane was obtained.

Example 17

The same procedure was performed as in Example 16, except that, in the step of "(2) Capping of pseudopolyrotaxane", the amount of 4-(4,6-dimethoxy-1,3,5-triazine-2-yl)-4-methylmorpholinium chloride was changed to 0.27 g (0.7 times the number of moles of the ends of the compound having carboxyl groups individually at each end of a PEG chain). In this manner, 15 g of a polyrotaxane was obtained.

Example 18

The same procedure was performed as in Example 15, except that, in the step of "(2) Capping of pseudopolyrotaxane", 0.7 g (0.25 times the moles of 4-(4,6-dimethoxy-1,3,5-triazine-2-yl)-4-methylmorpholinium chloride) of N-methylmorpholine was further added. In this manner, 39 g of a polyrotaxane was obtained.

Example 19

The same procedure was performed as in Example 16, except that, in the step of "(2) Capping of pseudopolyrotaxane", 1.4 g (0.25 times the moles of 4-(4,6-dimethoxy-1,3,5-triazine-2-yl)-4-methylmorpholinium chloride) of N-methylmorpholine was further added. In this manner, 50 g of a polyrotaxane was obtained.

Example 20

The same procedure was performed as in Example 18, except that, in the step of "(2) Capping of pseudopolyrotaxane", the amount of 4-(4,6-dimethoxy-1,3,5-triazine-2-yl)-4-methylmorpholinium chloride was changed to 3.8 g (10 times the number of moles of the ends of the compound having carboxyl groups individually at each end of a PEG chain); and the amount of the further added N-methylmorpholine was changed to 0.35 g (0.25 times the moles of 4-(4,6-dimethoxy-1,3,5-triazine-2-yl)-4-methylmorpholinium chloride). In this manner, 20 g of a polyrotaxane was obtained.

Example 21

The same procedure was performed as in Example 16, except that, in the step of "(2) Capping of pseudopolyrotaxane", 2.8 g (0.5 times the moles of 4-(4,6-dimethoxy-1,3,5-triazine-2-yl)-4-methylmorpholinium chloride) of N-methylmorpholine was further added. In this manner, 42 g of a polyrotaxane was obtained.

Example 22

The same procedure was performed as in Example 18, except that, in the step of "(2) Capping of pseudopolyrotaxane", the amount of the further added N-methylmorpholine was changed to 2.8 g (equivalent amount to 4-(4,6-dimethoxy-1,3,5-triazine-2-yl)-4-methylmorpholinium chloride). In this manner, 20 g of a polyrotaxane was obtained.

Example 23

The same procedure was performed as in Example 19, except that, in the step of "(1) Preparation of aqueous dispersion of pseudopolyrotaxane", 245 g of sodium chloride (24.6% by mass of the amount of total ingredients charged in "(1) Preparation of aqueous dispersion of pseudopolyrotaxane") was further added; and in the step of "(2) Capping of pseudopolyrotaxane", the reaction temperature was changed to 80° C. In this manner, 58 g of a polyrotaxane was obtained.

The volume average particle size of the pseudopolyrotaxane particles in the aqueous dispersion of pseudopolyrotaxane was 10 µm.

Example 24

The same procedure was performed as in Example 18, except that, in the step of "(1) Preparation of aqueous dispersion of pseudopolyrotaxane", 100 g of sodium sulfate (11.8% by mass of the amount of total ingredients charged in "(1) Preparation of aqueous dispersion of pseudopolyrotaxane") was further added. In this manner, 52 g of a polyrotaxane was obtained.

The volume average particle size of the pseudopolyrotaxane particles in the aqueous dispersion of pseudopolyrotaxane was 10 µm.

Example 25

The same procedure was performed as in Example 18, except that, in the step of "(1) Preparation of aqueous dispersion of pseudopolyrotaxane", the prepared aqueous dispersion of pseudopolyrotaxane was centrifuged to remove a supernatant, water was added to the prepared pseudopolyrotaxane in the form of liquid-containing cake so that the concentration (solid concentration) of pseudopolyrotaxane in the aqueous dispersion of pseudopolyrotaxane was controlled to 30% by mass, and the solution was mixed by stirring to prepare 330 g of an aqueous dispersion of pseudopolyrotaxane having a solid concentration of 30% by mass; and in the step of "(2) Capping of pseudopolyrotaxane", 330 g of the prepared aqueous dispersion of pseudopolyrotaxane (solid concentration 30% by mass) was used instead of 750 g of the aqueous dispersion of pseudopolyrotaxane (solid concentration 13.3% by mass). In this manner, 41 g of a polyrotaxane was obtained.

The volume average particle size of the pseudopolyrotaxane particles in the aqueous dispersion of pseudopolyrotaxane was 11 µm.

Example 26

The same procedure was performed as in Example 18, except that, in the step of "(1) Preparation of aqueous dispersion of pseudopolyrotaxane", the prepared aqueous dispersion of pseudopolyrotaxane was centrifuged to remove a supernatant, water and acetone were added to the prepared pseudopolyrotaxane in the form of liquid-containing cake so that the concentration (solid concentration) of a pseudopolyrotaxane in the aqueous dispersion of pseudopolyrotaxane was controlled to 25% by mass, and the mass ratio of acetone to water was set to 1:1; and the solution was mixed by stirring to prepare 400 g of an aqueous dispersion of pseudopolyrotaxane having a solid concentration of 25% by mass; and in the step of "(2) Capping of pseudopolyrotaxane", 400 g of the prepared aqueous dispersion of pseudopolyrotaxane (solid concentration 25% by mass) was used instead of 750 g of the aqueous dispersion of pseudopolyrotaxane (solid concentration 13.3% by mass). In this manner, 46 g of a polyrotaxane was obtained.

Example 27

The same procedure was performed as in Example 18, except that, in the step of "(2) Capping of pseudopolyrotaxane", the amount of adamantanamine hydrochloride was changed to 0.31 g (1.2 times the number of moles of the ends of the compound having carboxyl groups individually at each end of a PEG chain). In this manner, 38 g of a polyrotaxane was obtained.

Example 28

The same procedure was performed as in Example 26, except that, in the step of "(1) Preparation of aqueous dispersion of pseudopolyrotaxane", water and dimethylacetamide were added instead of water and acetone to the prepared pseudopolyrotaxane in the form of liquid-containing cake. In this manner, 46 g of a polyrotaxane was obtained.

The volume average particle size of the pseudopolyrotaxane particles in the aqueous dispersion of pseudopolyrotaxane was 11 µm.

Example 29

The same procedure was performed as in Example 19, except that, in the step of "(1) Preparation of aqueous dispersion of pseudopolyrotaxane", the compound having carboxyl groups individually at each end of a PEG chain prepared by the method of Production Example 2 was used instead of the compound having carboxyl groups individually at each end of a PEG chain prepared by the method of Production Example 1; and in the step of "(2) Capping of pseudopolyrotaxane", the amount of adamantanamine hydrochloride was changed to 3.5 g (40 times the number of moles of the ends of the compound having carboxyl groups individually at each end of a PEG chain), the amount of 4-(4,6-dimethoxy-1,3,5-triazine-2-yl)-4-methylmorpholinium chloride was changed to 5.5 g (40 times the number of moles of the ends of the compound having carboxyl groups individually at each end of a PEG chain), and the amount of the further added N-methylmorpholine was changed to 0.5 g (0.25 times the moles of 4-(4,6-dimethoxy-1,3,5-triazine-2-yl)-4-methylmorpholinium chloride). In this manner, 42 g of a polyrotaxane was obtained.

The volume average particle size of the pseudopolyrotaxane particles in the aqueous dispersion of pseudopolyrotaxane was 12 μm.

Example 30

The same procedure was performed as in Example 19, except that, in the step of "(2) Capping of pseudopolyrotaxane", 5.1 g (30 times the number of moles of the ends of the compound having carboxyl groups individually at each end of a PEG chain) of 1-hydroxyadamantane was used instead of adamantanamine hydrochloride as a capping agent. In this manner, 26 g of a polyrotaxane was obtained.

Example 31

The same procedure was performed as in Example 1, except that, in the step of "(2) Capping of pseudopolyrotaxane", 3.95 g (1.27 times the moles of 2-chloro-4,6-dimethoxy-1,3,5-triazine) of 1,4-dimethylpiperazine was added instead of N-methylmorpholine as a tertiary amine. In this manner, 24 g of a polyrotaxane was obtained.

Example 32

The same procedure was performed as in Example 18, except that, in the step of "(2) Capping of pseudopolyrotaxane", 0.79 g (0.25 times the moles of 4-(4,6-dimethoxy-1,3,5-triazine-2-yl)-4-methylmorpholinium chloride) of 1,4-dimethylpiperazine was added instead of N-methylmorpholine as a tertiary amine. In this manner, 30 g of a polyrotaxane was obtained.

Example 33

The same procedure was performed as in Example 18, except that, in the step of "(2) Capping of pseudopolyrotaxane", 0.89 g (0.25 times the moles of 4-(4,6-dimethoxy-1,3,5-triazine-2-yl)-4-methylmorpholinium chloride) of N,N-diisopropylethylamine was added instead of N-methylmorpholine as a tertiary amine. In this manner, 31 g of a polyrotaxane was obtained.

Example 34

The same procedure was performed as in Example 1, except that, in the step of "(2) Capping of pseudopolyrotaxane", the amount of N-methylmorpholine was changed to 2.8 g (equivalent amount to 2-chloro-4,6-dimethoxy-1,3,5-triazine), and 0.79 g (0.22 times the moles of 2-chloro-4,6-dimethoxy-1,3,5-triazine) of 1,4-dimethylpiperazine was further added. In this manner, 24 g of a polyrotaxane was obtained.

Comparative Example 1

Capping of a pseudopolyrotaxane was performed as in Example 1, except that, in the step of "(2) Capping of pseudopolyrotaxane", 4.8 g of a BOP reagent (benzotriazole-1-yl-oxy-tris(dimethylamino)phosphonium hexafluorophosphate) and 3.5 g of diisopropylethylamine were used instead of 2-chloro-4,6-dimethoxy-1,3,5-triazine and N-methylmorpholine. However, a capping reaction did not proceed, and no polyrotaxane was therefore obtained.

Comparative Example 2

The same procedure was performed as in Example 1, except that, in the step of "(1) Preparation of aqueous dispersion of pseudopolyrotaxane", the prepared aqueous dispersion of pseudopolyrotaxane was freeze-dried (dried at −10 to 20° C. for 48 hours) to give an agglomerated pseudopolyrotaxane, the agglomerated pseudopolyrotaxane was ground to give 100 g of a pseudopolyrotaxane in a powder form, 650 ml of dimethylformamide was added to the pseudopolyrotaxane, and the solution was mixed by stirring to give an aqueous dispersion; and in the step of "(2) Capping of pseudopolyrotaxane", 4.8 g of a BOP reagent (benzotriazole-1-yl-oxy-tris(dimethylamino)phosphonium hexafluorophosphate) and 3.5 g of diisopropylethylamine were used instead of 2-chloro-4,6-dimethoxy-1,3,5-triazine and N-methylmorpholine. In this manner, 56 g of a polyrotaxane was obtained.

Comparative Example 3

Capping of a pseudopolyrotaxane was performed as in Example 1, except that, in the step of "(2) Capping of pseudopolyrotaxane", no N-methylmorpholine was used. However, a capping reaction did not proceed, and no polyrotaxane was therefore obtained.

Comparative Example 4

Capping of a pseudopolyrotaxane was performed as in Example 1, except that, in the step of "(2) Capping of pseudopolyrotaxane", no 2-chloro-4,6-dimethoxy-1,3,5-triazine was used. However, a capping reaction did not proceed, and no polyrotaxane was therefore obtained.

Evaluation

The polyrotaxanes obtained in the examples and the comparative examples were measured for an inclusion rate by $^1$H-NMR using a NMR measuring device (VARIAN Mercury-400BB produced by Varian Technologies Japan Ltd.). Table 1 shows the results.

TABLE 1

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Inclusion rate (%) | 32 | 32 | 32 | 32 | 33 | 32 | 36 | 35 | 32 | 36 | 35 | 36 | 30 | 31 | 31 |

| | Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Inclusion rate (%) | 32 | 32 | 32 | 33 | 32 | 32 | 32 | 36 | 35 | 32 | 36 | 35 | 36 | 30 | 31 |

| | Example | | | | Comparative Example | | | |
|---|---|---|---|---|---|---|---|---|
| | 31 | 32 | 33 | 34 | 1 | 2 | 3 | 4 |
| Inclusion rate (%) | 30 | 31 | 30 | 32 | — | 19 | — | — |

INDUSTRIAL APPLICABILITY

The present invention can provide a method for producing a polyrotaxane which enables industrially advantageous production of a polyrotaxane with a high inclusion rate.

The invention claimed is:

1. A method for producing a polyrotaxane that includes a cyclodextrin; a compound having a repeating structural unit represented by the following formula (1), and threading through a cavity of the cyclodextrin in a skewered manner to be included in the cyclodextrin; and capping groups individually placed at each end of a molecule of the compound having a repeating structural unit represented by the formula (1) to prevent the cyclodextrin from separating, the method comprising:

a step 1 of mixing the compound having a repeating structural unit represented by the formula (1) and the cyclodextrin in an aqueous medium to prepare an aqueous dispersion of pseudopolyrotaxan particles in which the compound having a repeating structural unit represented by the formula (1) is included in a cavity of a cyclodextrin molecule in a skewered manner; and a step 2 of mixing a triazine compound represented by the following formula (2), a compound having at least one tertiary amino group, the aqueous dispersion of pseudopolyrotaxane particles prepared in the step 1, and a capping agent to introduce capping groups individually at each end of a molecule of the compound having a repeating structural unit represented by the formula (1) in the pseudopolyrotaxane particles,

[Chem. 1]

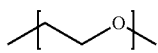

(1)

[Chem. 2]

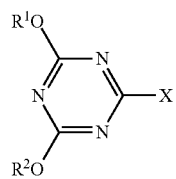

(2)

wherein, in the formula (2), $R^1$ and $R^2$ are each independently a C1-C4 alkyl group or a C6-C8 aryl group, and X represents a halogen atom.

2. The method for producing a polyrotaxane according to claim 1,
wherein the triazine compound represented by the formula (2) is 2-chloro-4,6-dimethoxy-1,3,5-triazine.

3. The method for producing a polyrotaxane according to claim 1,
wherein the triazine compound represented by the formula (2) is used in an amount of 0.7 to 50 times the number of moles of end groups of the compound having a repeating structural unit represented by the formula (1).

4. The method for producing a polyrotaxane according to claim 1,
wherein the compound having at least one tertiary amino group is a morpholine compound represented by the following formula (3):

[Chem. 3]

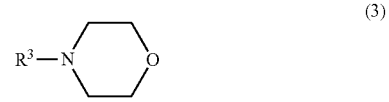

(3)

wherein, in the formula (3), $R^3$ represents a C1-C4 alkyl group.

5. The method for producing a polyrotaxane according to claim 4,
wherein the morpholine compound represented by the formula (3) is N-methylmorpholine.

6. The method for producing a polyrotaxane according to claim 1,
wherein the compound having at least one tertiary amino group is used in an amount of 0.1 to 3 mol per mole of the triazine compound represented by the formula (2).

7. The method for producing a polyrotaxane according to claim 1,
wherein the step 2 includes a step 2-1 of preparing a quaternary ammonium salt represented by the following formula (4) by mixing and reacting the triazine compound represented by the formula (2) and the compound having at least one tertiary amino group; and a step 2-2 of mixing the quaternary ammonium salt represented by the formula (4), the aqueous dispersion of pseudopolyrotaxane particles prepared in the step 1, and the capping agent,

[Chem. 4]

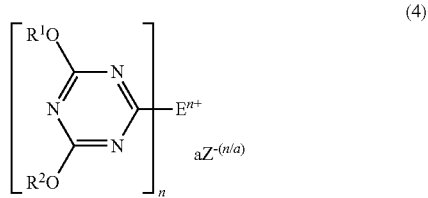

(4)

wherein, in the formula (4), E is an organic group containing one or two tertiary amino groups, and a monovalent or divalent organic group attached to a triazine ring via a nitrogen atom of the one or two tertiary amino groups; n is 1 when E contains one tertiary amino group, or is 2 when E contains two tertiary amino groups; $R^1$ and $R^2$ each independently represent a C1-C4 alkyl group or a C6-C8 aryl group; a is 1 or 2, and is 1 when n is 1; and $Z^{-(n/a)}$ represents a counter anion having a valence of (n/a).

8. The method for producing a polyrotaxane according to claim 7,
wherein the quaternary ammonium salt represented by the formula (4) is a quaternary ammonium salt represented by the following formula (5):

[Chem. 5]

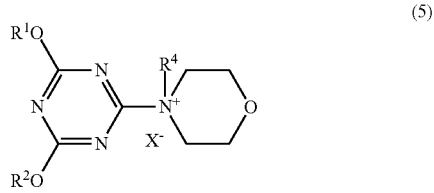

(5)

wherein, in the formula (5), $R^1$ and $R^2$ are each independently a C1-C4 alkyl group or a C6-C8 aryl group, $R^4$ is a C1-C4 alkyl group, and X represents a halogen atom.

9. The method for producing a polyrotaxane according to claim 7,
wherein the quaternary ammonium salt represented by the formula (4) is used in an amount of 0.7 to 50 times the number of moles of end groups of the compound having a repeating structural unit represented by the formula (1).

10. The method for producing a polyrotaxane according to claim 7,
wherein, in the step 2-2, the morpholine compound represented by the following formula (3) is further added

[Chem. 6]

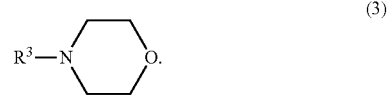

(3)

11. The method for producing a polyrotaxane according to claim 1,
wherein the compound having a repeating structural unit represented by the formula (1) to be used in the step 1 has a mass average molecular weight of 1000 to 500000.

12. The method for producing a polyrotaxane according to claim 1,
wherein both the end groups of the compound having a repeating structural unit represented by the formula (1) to be used in the step 1 are the same and are hydroxyl groups, carboxyl groups, or amino groups.

13. The method for producing a polyrotaxane according to claim 1,
wherein a mass ratio of the compound having a repeating structural unit represented by the formula (1) to the cyclodextrin to be used in the step 1 is 1:2 to 1:5.

14. The method for producing a polyrotaxane according to claim 1,
wherein the aqueous medium to be used in the step 1 is water or a mixed solvent of an aqueous organic solvent and water.

15. The method for producing a polyrotaxane according to claim 1,
wherein the step 2 is performed in the presence of an inorganic salt.

16. The method for producing a polyrotaxane according to claim 1,
wherein the step 2 is performed in the presence of an aqueous organic solvent.

* * * * *